United States Patent [19]

Harada

[11] Patent Number: 5,442,440
[45] Date of Patent: Aug. 15, 1995

[54] SPECTROSCOPE

[75] Inventor: Yoichi Harada, Tokyo, Japan

[73] Assignee: Seiko Instruments Inc., Tokyo, Japan

[21] Appl. No.: 193,507

[22] Filed: Feb. 7, 1994

[30] Foreign Application Priority Data

Feb. 8, 1993 [JP] Japan .................................. 5-020408

[51] Int. Cl.6 .......................... G01J 3/28; G01O 3/32
[52] U.S. Cl. .................................... 356/328; 356/300
[58] Field of Search ................ 356/326, 328, 330–334, 356/300

[56] References Cited

U.S. PATENT DOCUMENTS 3,385,160 5/1968 Dawson et al. ...................... 356/328
4,191,473 3/1980 Hansch ................................ 356/300

OTHER PUBLICATIONS

Denton et al, "Charge–Injection and Charge Coupled devices in Practical Chemical Analysis," 1983, American Chemical Society.

Primary Examiner—Vincent P. McGraw
Assistant Examiner—K. P. Hantis
Attorney, Agent, or Firm—Spensley Horn Jubas & Lubitz

[57] ABSTRACT

A spectroscope or spectrometer for detecting a driving position of a main wavelength dispersive device using a diffraction line produced in that light from a light source having a narrow wavelength bandwidth is incident on a sub-wavelength dispersive device in an arrangement that a plane diffraction grating is used as the sub-wavelength dispersive device which is affixed on a driving axis in a manner of forming a suitable angle with the main wavelength dispersive device. When the main wavelength dispersive device is used between 0° and 90°, a diffraction angle of the sub-wavelength dispersive device comes within about 45°. In such a range, the angular dispersion is not changed significantly, thus the interval between diffraction lines is hardly varied. For this reason, the width of a sub-detector can always be set at an optimum condition for raising the positional detecting accuracy while one or more diffraction lines are allowed to be incident.

6 Claims, 5 Drawing Sheets

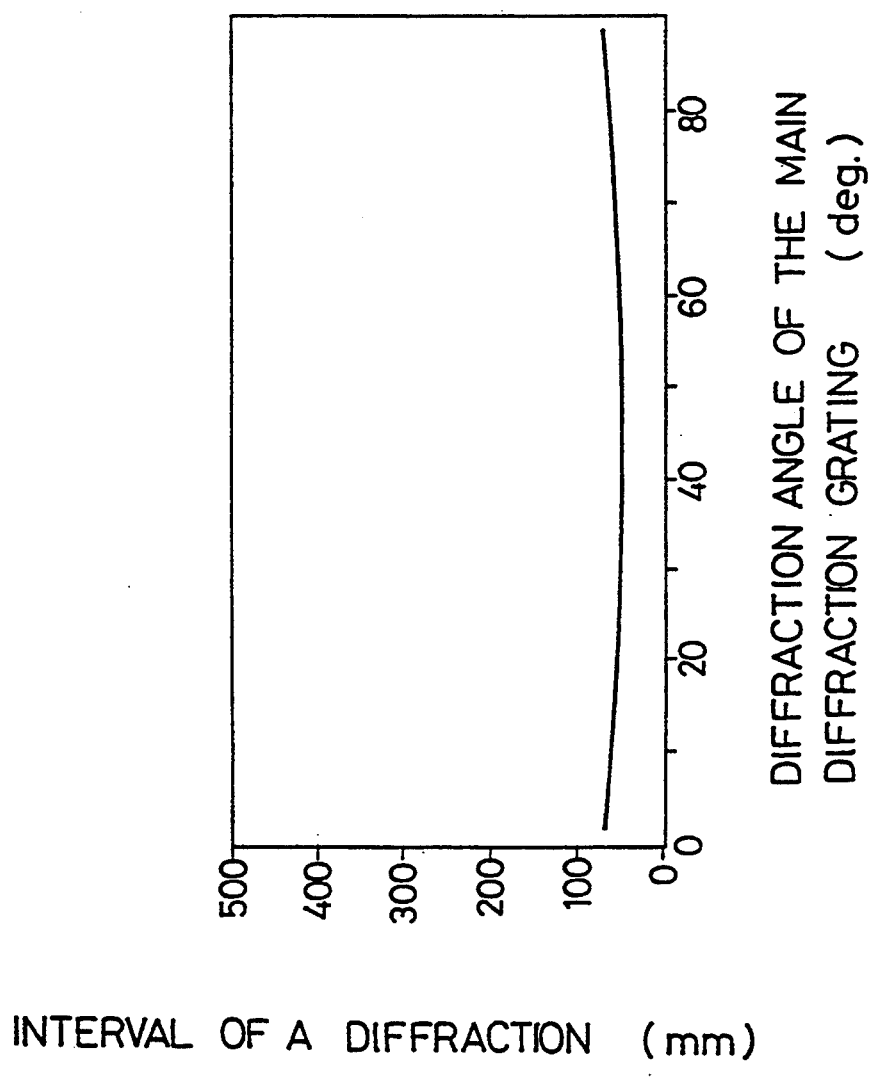

SPECTROSCOPE

BACKGROUND OF THE INVENTION

The present invention relates to spectroscopes or spectrometers for detecting a driving position of a main wavelength dispersive device, and particularly relates to spectroscopes having positional detecting structures of the wavelengths.

In known main wavelength dispersive devices for spectrum analysis of light, such as described in GB Pat. No. 2,208,430, a reflection type diffraction grating (main grating) having 1800 to 4800 grooves/mm is used. A plane type diffraction grating (sub-grating) having 10 to 100 grooves/mm is fixed to, and driven together with, the main grating for a sub-wavelength dispersive device for position-detecting the main grating. The positional detection of the main grating means detecting an incident angle of light to be analyzed and/or an emitting angle of spectrum-analyzed light, so that a spectrum-analyzed wavelength detected by a detector can accurately be specified.

An incident slit is incident with the light to be analyzed. The light incident from the incident slit is spectrum-analyzed by the main grating and thereafter emits from an outgoing slit to be detected at a main detector. Then, by suitably driving a driving unit, light with an optionally selected wavelength is allowed to emit to the outgoing slit, enabling the intensity of the light having the optionally selected wavelength to be measured.

On the other hand, light incident on a sub-grating has a narrow wavelength band, such as a laser beam for positional detection. The incident light on the sub-grating is diffracted by the sub-grating, and thereafter is incident on the sub-detector having a plurality of detecting elements aligned in a row in the analyzing direction. With the smaller number of grooves of the sub-grating, the diffraction light having a plurality of diffraction orders is diffracted by the sub-grating.

An interval of the diffraction light incident on the sub-detector is determined in accordance with a driving position, the number of grooves of the sub-grating, wavelength of a light source, and a distance from the sub-grating to the sub-detector, and the like.

For this reason, the diffraction light transverses one by one on the sub-detector depending on driving of the sub-grating, in addition, each interval of the diffraction light and the width of the sub-detector are set so that one diffraction light is always incident on the sub-detector, and the main grating and the sub-grating are fixed and simultaneously driven to enable positional detecting of the wavelength dispersive device (main grating) by using the diffraction light.

In case of fixing the main grating with the sub-grating, affixing on the same plane simplifies designing, manufacturing, driving operation, and positional detecting control, this therefore is a reason of fixing it on the same plane.

To raise the accuracy of positional detecting, the size of the detecting element of the sub-detector may preferably approximate a half width of intensity distribution of the diffraction light. The smaller number of detecting elements is more preferable in view of the data processing. The width of the sub-detector is determined depending on a size of the detecting element and the number of such elements.

On the other hand, the width of the sub-detector is always required to be incident one or more diffraction lights. Thus, the interval and the half width of intensity distribution of the diffraction light may preferably be constant as much as possible. From among these, the half width is substantially constant.

Generally in the diffraction grating, the larger the diffraction angle, the larger the angle distribution of diffraction light, and the larger the interval of the diffraction light provided. In particular, as one approaches an upper limit of the diffraction range, it becomes substantially larger, and approaches as much as ten times that associated with a smaller diffraction angle.

When fixing the main grating with the sub-grating on the same plane, the drawback is that, in case of spectrum-analyzing light having a wavelength capable of enlarging the diffraction angle of the main grating, the diffraction angle of the sub-grating comes larger and the interval of the diffraction light is also enlarged.

SUMMARY OF THE INVENTION

According to the invention, a main wavelength dispersive device (main diffraction grating) and a sub-wavelength dispersive device (sub-diffraction grating) are fixed in position relative to one another with an angle provided therebetween. The main diffraction grating, which is used at most at a diffraction angle between 0° and 90°, is affixed on a driving axis with a tilt angle from 40° to 45° formed between the main wavelength dispersive device and the sub-wavelength dispersive device.

A diffraction angle is obtained from the interval of the diffraction light, which produces an angle between the main wavelength dispersive device and the sub-wavelength dispersive device.

With the main wavelength dispersive device used from 0° to 90°, a diffraction angle of the sub-wavelength dispersive device is approximately within ±45°, and in such a range, the angle dispersion is not substantially changed, so that there is always produced an optimum usage condition of the sub-detector.

BRIEF DESCRIPTION OF DRAWING

FIG. 2a is a curve showing a relationship of a diffraction angle relative to an interval of a diffraction light in an embodiment of the present invention.

DESCRIPTION OF THE PREFERRED EMBODIMENTS an embodiment of the invention will be described in detail with reference to the drawings.

Figure 1:
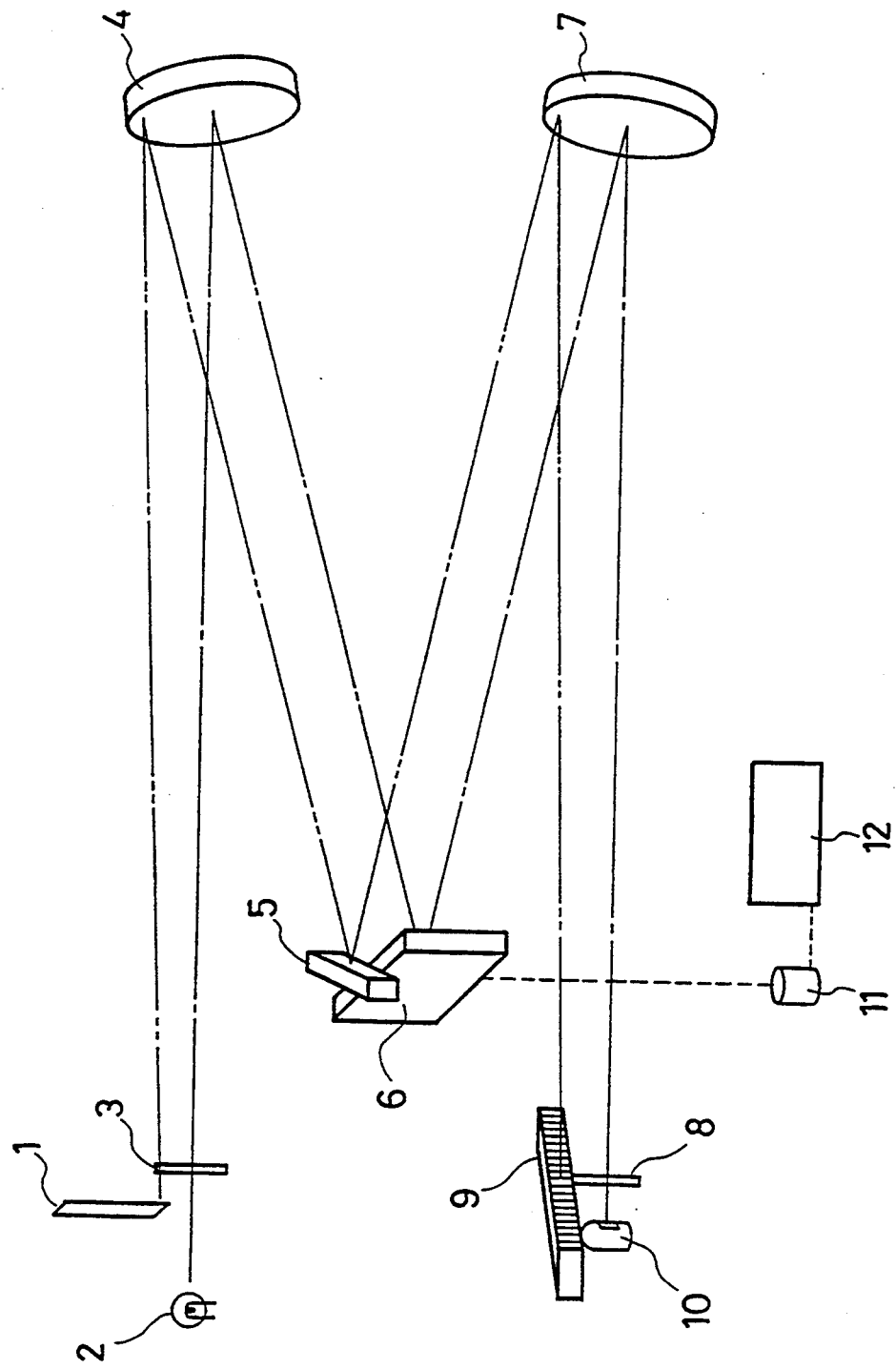
FIG. 1 is a schematic view showing one embodiment of the present invention.

In FIG. 1, an incident slit 3 allows light from a spectroscope light source 2 to be assume a beam shape. For such spectroscope light, there can be sometimes used the light for an atomic absorption spectrochemical analysis, the light for an ICP spectrometry, or the light for an infrared spectral analysis (an infrared spectrochemical analysis) or the like.

The light incident from the incident slit 3 becomes collimated light at a camera mirror 4, which is a concave mirror, and thereafter is incident on a main grating 6, which is a main wavelength dispersive device. The main grating 6 is a reflection type diffraction grating having approximately 1800 to 4800 grooves/mm grooves also being referred to as slits) in parallel with the larger transverse dimension of the beam defined by the long transverse dimension of incident slit 3.

The light incident on the main grating 6 is analyzed by the main grating 6 and is then reflected by a collimator mirror 7 for converging the spectrum-analyzed light, and is emitted via an exit slit 8 to be detected at a main detector 10 behind slit 8.

Then, the main grating 6 is rotated in a spectrum-analyzing direction by a driving unit 11, the rotation being accurately controlled by a control unit 12. By suitably driving the driving unit 11, light having an optional wavelength is emitted to slit 8 to achieve measurement intensity of the light having the optional wavelength.

A light source 1 producing light having a very narrow wavelength bandwidth is disposed substantially above or below the level of the beam formed by slit 3, in the direction of the long transverse dimension of incident slit 3, but overlaps at least a small portion of slit 3 so that the light emitted is incident on the incident slit 3. The light having a very narrow wavelength bandwidth (laser light or the like) emitted from the light source 1 travels through the incident slit 3, is diffracted and expanded in the lateral direction, and simultaneously is incident on the camera mirror 4. The light is collimated by camera mirror 4 and is then incident on a sub-grating 5 and is diffracted in plural directions on a plural order basis. The sub-grating is provided with approximately 10 to 100 slits/mm in the same direction as main grating 6. The light diffracted by the sub-grating 5 is reflected by collimator mirror 7 and images on a sub-detector 9.

The sub-grating 5 is disposed above or below main grating 6, depending on whether light source 1 is above or below slit 3, being supported for rotation with main grating 6 and being oriented, about their common axis of rotation, at an angle of about 45° with main grating 6. When main grating 6 is driven through a diffraction angle of from 0° to 90°, sub-grating 5 is driven through an angle of from −45° to 45°. Here, the diffraction angle means an angle formed by a normal to the main grating 6 with the spectrum-analyzed light emitted by main grating 6.

As the sub-grating 5 is driven, i.e. rotated, together with the main grating 6, a plurality of diffraction light lines traverse sub-detector 9. The light wavelength of the light source 1 is already known. Thus, if the position at a certain point is recorded or stored, the position of the main grating 6 is detected by the number of diffraction lines and the positions of the diffraction lines that have traversed. The diffraction angle of the sub-grating 5 is only changed up to ±45°, thus an interval of the diffraction light is hardly changed.

Figure 2B:
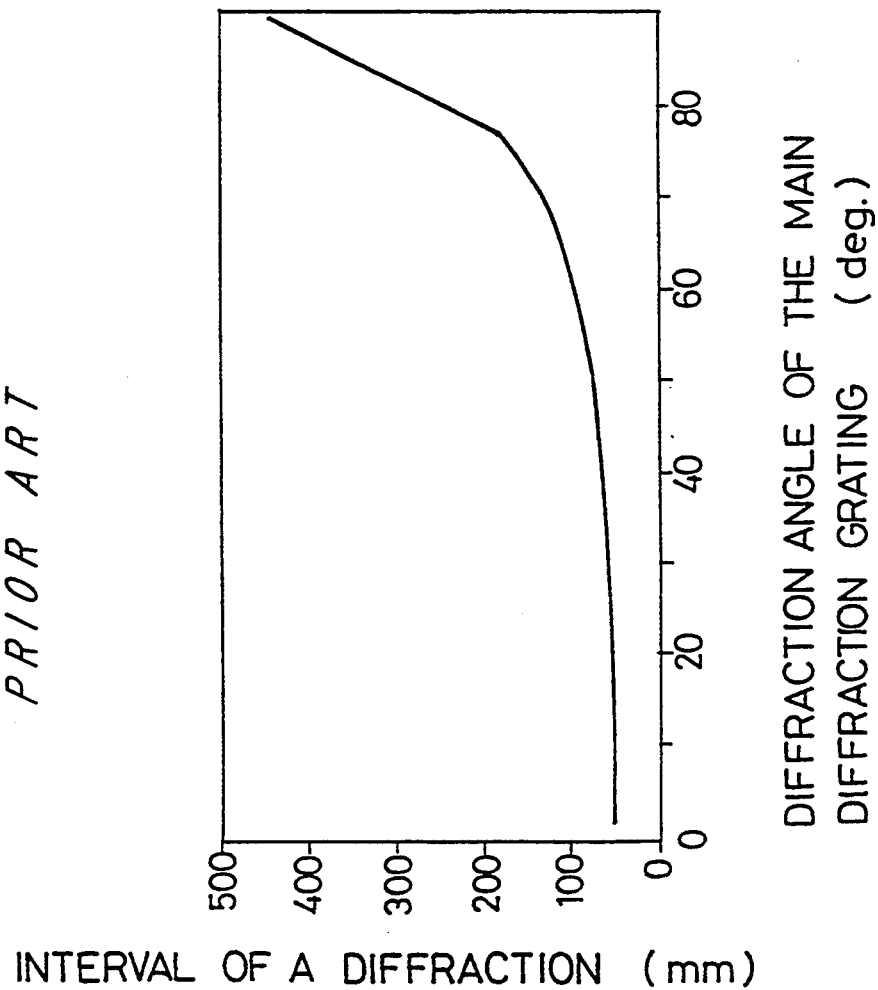
FIG. 2b is a curve showing a relationship of a diffraction angle relative to an interval of a diffraction light according to the prior art.

FIG. 2a shows a calculated relationship between the diffraction angle by the sub-grating 5 and the intervals of the diffraction angle in the embodiment of the present invention, and FIG. 2b shows a calculated relationship for a conventional example. The calculation equation for calculating these relationships is as follows.

The diffraction angle $\theta(m)$ of the diffraction light from the sub-grating 5 is represented by the equation (1), and the interval x(m) of the diffraction light is represented by the equation (2).

$$\theta = \mathrm{Sin}^{-1}\{(m\lambda)/(2d\ \mathrm{Cos}\phi)\} \quad (1)$$

$$x(m) = 2f\{\theta(m) - \theta(m+1)\} \quad (2)$$

where "m" represents the number of diffraction orders, λ is the wavelength of the light source, "d" is a grating constant of the sub-grating 5 an specifically the interval between grooves, $\phi$ is the angle formed by the camera mirror 4 with the collimator mirror 7 towards the sub-grating 5, "f" the focal length of the spectroscope, and $\theta(m)$ and $\theta(m+1)$ represent diffraction orders of two respective adjacent diffraction lines.

In FIGS. 2a and 2b, λ=1000 nm, d=20 μm (the number of grooves is 50/mm), $\phi=0$, f=1 m, and the angle formed by the main grating 6 with the sub-grating 5 in this embodiment of the invention is 45°.

The horizontal axis in FIGS. 2a and 2b represents the diffraction angle of the spectroscope light in the main grating 6. Accordingly, a numerical value of −45° as a horizontal axis is enough for allowing the horizontal axis in FIG. 2a to show the diffraction angle of the sub-grating 5. The diffraction angles for the main grating 6 and the sub-grating 5 are the same in case of FIG. 2b.

As shown in FIG. 2a, according to the principle of the present invention, even if the spectroscope light source 2 is analyzed at a diffraction angle between 0° and 90° by the main grating 6, diffraction lines of light from source 1 having the respective numbers of diffraction orders produced by being spectrum-analyzed by sub-grating 5 have narrow intervals which are constant. However in FIG. 2b, when the conventional main grating 6 and sub-grating 5 are set on the same plane, and if a diffraction angle equal to or more than about 60° is provided by the main grating, then diffraction lines having the respective numbers of diffraction orders produced by further spectrum-analyzing the light from source 1 by the sub-grating 5 come to have wider intervals which are substantially not constant.

Figure 3:
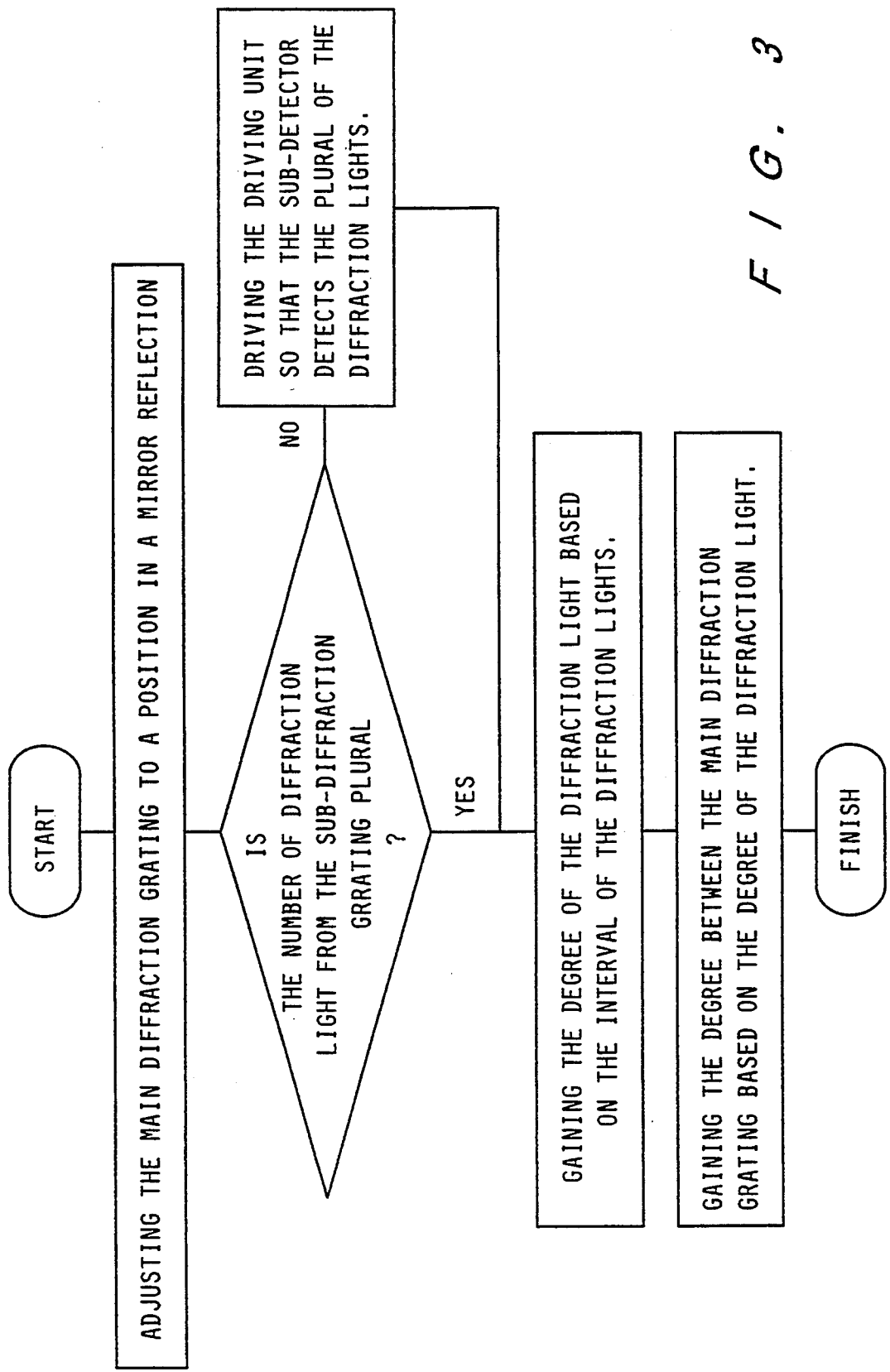
FIG. 3 is a flow chart of the operation of an embodiment of the invention.
Figure 4:
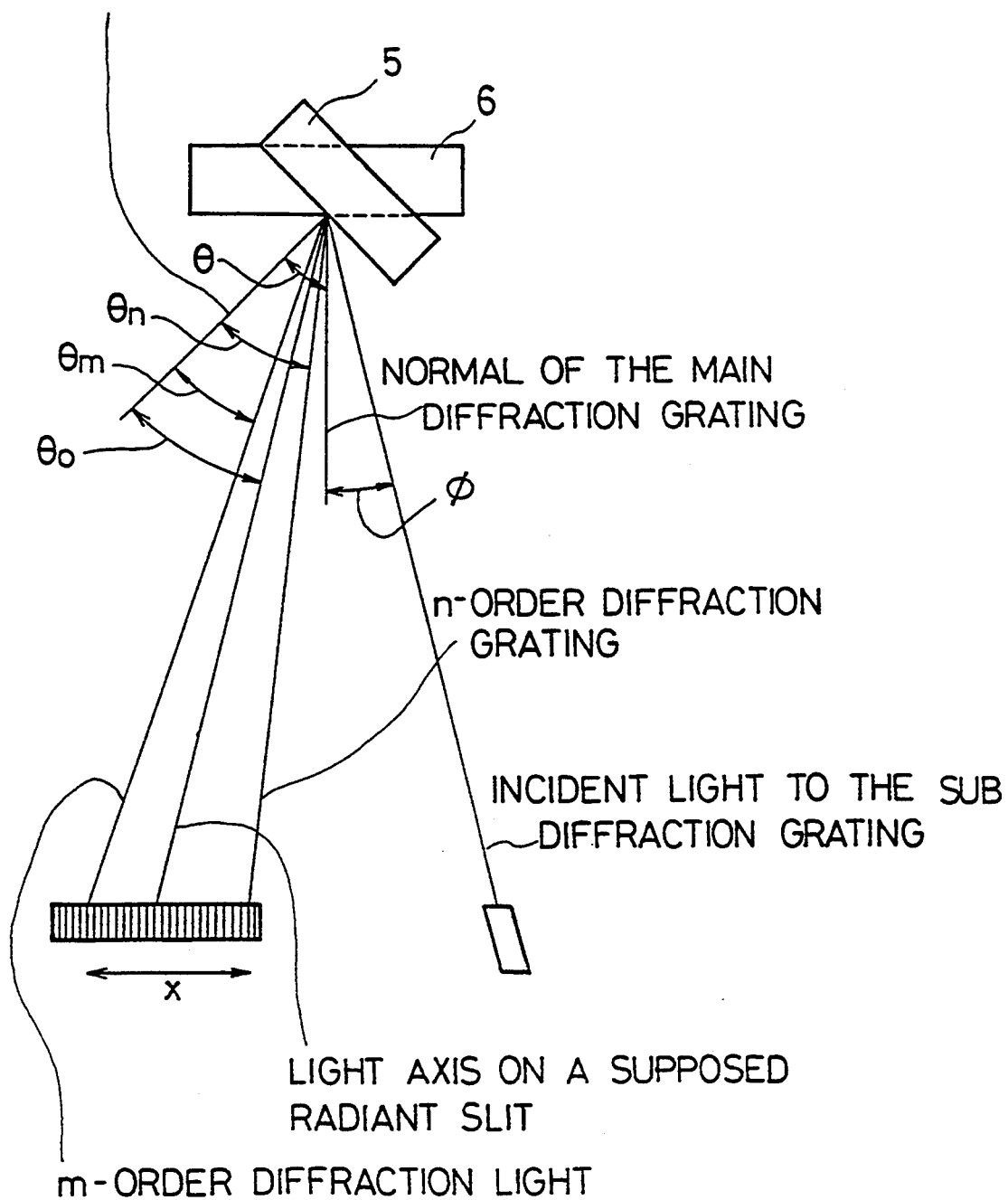
FIG. 4 is a plan view illustrating the geometry of a device according to the invention.

Next, a further description will be provided with reference to FIGS. 3 and 4, in combination with FIG. 1. FIG. 3 is a flow chart for illustrating operation of the present invention, and FIG. 4 is a view for illustrating a method of calculation.

In FIG. 1, driving unit 11 is controlled by control unit 12. When an instruction of wavelength calibration comes to the control unit 12, the control unit 12 operates as follows.

First, the control unit 12 drives the driving unit 11 so that the main grating 6 is positioned on mirror-reflection, and adjusted to obtain the maximum intensity of detecting strength at the main detector 10. More specifically, the incident angle of light from the camera mirror 4 and the emitting angle from the main grating 6 to the collimator mirror 7 are made equal to each other. Then, control unit 12 determines whether the diffraction line(s) emitted from the sub-grating 5 and incident on the sub-detector 9 are plural or not If a plurality of diffraction lines are incident, the control proceeds directly to the next calculation to calculate an angle $\theta(m)$ of a plurality of diffraction lines from an interval x(m) of a plurality of diffraction lines in accordance with equation (2), above, further to calculate an angle $\theta_0$ for the virtual position of the outgoing slit 8, and to calculate an angle $\theta$ of the sub-grating 5 with the main grating 6 in accordance with the equation (3).

$$\theta = \theta_0 + \phi \tag{3}$$

The control proceeds to drive for a plurality of diffraction lines to be incident when a single diffraction line only is incident. Then, a driving angle of $\Delta\theta$ is stored until said plurality of diffraction lines are incident.

Thereafter, the control proceeds to calculate an angle $\theta(m)$ of a plurality of diffraction lines from an interval $x(m)$ of a plurality of diffraction lines in accordance with the equation (2), to calculate an angle for a virtual position of the outgoing slit 8, and to calculate an angle $\theta$ of the sub-grating 5 with the main grating 6 in accordance with the equation (4).

$$\theta = \theta_0 + \phi 35 \, \Delta\theta \tag{4}$$

where the virtual position of the outgoing slit 8 is not always required to be coincident with an actual position of the outgoing slit 8.

Thereafter, using the obtained $\theta$, the virtual position of the outgoing slit 8 is detected from the position of the diffraction line.

The spectroscope in FIG. 1 is of the Czerny-Turner type. It can be used for spectroscopes of dispersive device rotating types such as the Ebert type and Seya-Namioka type. For the main wavelength dispersive device, a plane diffraction grating as herein described can be used, and in addition to this there can be utilized the other types such as a concave diffraction grating, transmission type diffraction grating, and prism and the like. The main grating 6 is ideally placed at the top or bottom of the sub-grating 5, but other arrangements may also be preferable.

The sub-grating 5 may preferably use the same camera mirror 4 and collimator mirror 7 as used in the main grating 6, or each grating may also preferably use a separate mirror or mirrors. In case of using a separate mirror, a flat mirror or a convex mirror may be used other than the concave mirror. For the light source 1, other than a single color laser light, there can be used a light source producing a narrower wavelength bandwidth such as a holocathode lamp or a mercury lamp or the like. The light source 1 may preferably be placed in front of an opening different from the incident slit 3, inside the incident slit 3, on a position of the camera mirror 4, or on a position of the collimator mirror 7 and the like, other than outside, and in front, of the incident slit 3. The angle of the incident light to the sub-grating 5 and the angle of the emitting light to the sub-detector 9 may preferably be perpendicular to the driving axis or may preferably form an angle with the driving axis.

The sub-grating 5 may preferably form an angle with the driving axis depending on the angle of the incident light to the sub-grating 5 and the angle of the emitting light to the sub-detector 8. The sub-detector 9 may preferably be positioned adjacent outgoing slit 8 or at the location of collimator mirror 7, or at any other suitable position inside or outside the spectroscope.

The angle formed between the receiving surface of main grating 6 an that of sub-grating 5 may preferably tend larger than 45° in case where the main grating 6 does not use a shorter wavelength-side, and to the contrary, tend smaller than 45° in case where it does not use a longer wavelength-side. In either of the cases, the best result can be obtained in which the main grating 6 is fixed so that the sub-grating 5 directs toward the vicinity of the center of an angle region actually used. An object to be irradiated by spectrum-analyzed light may preferably be placed between the main detector 10 and the outgoing slit 8.

In the embodiment described above, one main detector 10 is arranged behind outgoing slit 8 relative to the optical axis. In another embodiment, instead of the outgoing slit 8 there may preferably be provided a main detector 10 in which, as in the sub-detector, a plurality of detecting elements are arranged in a row (in the spectrum-analyzing direction). In this case, the respective detecting elements of the main detector 10 are smaller and have slit functions respectively.

When the main wavelength dispersive device is used between 0° and 90°, the diffraction angle of the sub-wavelength dispersive device is substantially within ±45 degrees. In such a range, the angle dispersion is not changed significantly, thus the interval between diffraction lines is hardly varied. For this reason, the width of the sub-detector can always be set at an optimum condition for raising the positional detecting accuracy while one or more diffraction lines are allowed to be incident.

In addition, the angle formed between the main wavelength dispersive device and the sub-wavelength dispersive device can be obtained from the interval of the diffraction lines.

This application relates to subject matter disclosed in Japanese Application number 5-20408, filed on Feb. 8, 1993, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. In a spectrum analysis apparatus comprising an incident slit, a main wavelength dispersive device, an outgoing slit, a main detector for detecting spectrum-analyzed light, a driving unit for driving the main wave length dispersive device, a control unit for controlling the driving unit, a light source for emitting light having a narrow wavelength bandwidth, a sub-wavelength dispersive device fixed to the main wavelength dispersive device to be driven with the main wavelength dispersive device, and a sub-detector having a plurality of detecting elements aligned in a row and detecting diffraction lines from the sub-wavelength dispersive device, the improvement wherein said sub-wavelength dispersive device is constituted by a plane diffraction grating, and said main wavelength dispersive device and said sub-wavelength dispersive device are fixed on a driving axis of said driving unit with an angular offset therebetween about the driving axis.

2. An apparatus as claimed in claim 1, wherein said main wavelength dispersive device is constituted by a reflection type diffraction grating, and when driving said diffraction gratings with said driving unit to a position where light incident from said incident slit and mirror-reflected at said diffraction grating of said main wavelength dispersive device is emitted to said outgoing slit, said diffraction gratings are not driven if there are plural diffraction lines incident on said sub-detector, and said diffraction gratings are driven if only one diffraction line is incident on the said sub-detector until a plurality of diffraction lines are incident on the said sub-detector, after which said apparatus obtains a diffraction angle of a plurality of diffraction lines in accordance with the interval between said plurality of diffraction lines, to obtain the angular position of said sub-wavelength dispersive device and to obtain an angular offset between said diffraction grating of said main wavelength dispersive device and said sub-wavelength dispersive device.

3. In a spectrum analysis apparatus comprising an incident slit, a main wavelength dispersive device, a main detector for detecting a spectrum-analyzed light and formed of detecting elements aligned in a row for detecting a diffraction line from the main wavelength dispersive device, a driving unit for driving the main wavelength dispersive device to a position, a control unit for controlling the driving unit, a light source for emitting light having a narrow wavelength bandwidth, a sub-wavelength dispersive device fixed to the main wavelength dispersive device to be rotatably driven with the main wavelength dispersive device, for diffracting light from the light source, and a sub-detector formed of a plurality of detecting elements aligned in row for detecting diffraction lines from the sub-wavelength dispersive device, light from the light source being incident on the sub-wavelength dispersive device, and the position to which the main wavelength dispersive device is driven being detected using diffraction lines from the sub-wavelength dispersive device, the improvement wherein said sub-wavelength dispersive device is constituted by a plane type diffraction grating, and said main wavelength dispersive device and said sub-wavelength dispersive device are fixed to be rotated about a driving axis of said driving unit with an angular offset therebetween about the driving axis.

4. An apparatus as claimed in claim 3, wherein said main wavelength dispersive device is constituted by a reflection type diffraction grating, and said control unit is operative such that, when driving said diffraction gratings with said driving unit to a position where light incident from said incident slit and mirror-reflected at said diffraction grating of said main wavelength dispersive device is emitted to the center of said main detector, said diffraction gratings are not driven if there are plural diffraction lines incident on said sub-detector and said dispersive devices are driven if only one diffraction line is incident on the said sub-detector until a plurality of diffraction lines are incident on the said sub-detector, after which said apparatus obtains a diffraction angle of a plurality of diffraction lines diffracted by said diffraction grating of said sub-wave length dispersive device in accordance with the interval between said plurality of diffraction lines, to obtain the angular position of said diffraction grating of said sub-wavelength dispersive device, and to obtain an angle where the main grating and the sub-grating are fixed in position.

5. A spectrum analysis device comprising:
an incident slit disposed for passing incident light to be spectrally investigated;
a main wavelength dispersive device for dispersing, in a dispersion direction, the incident light which passes through the incident slit;
an exit slit disposed for passing only a desired wavelength component of the incident light;
a main detector disposed for detecting light which passes through the exit slit;
a driving unit connected for rotating said main wavelength dispersive device in the light dispersion direction;
a control unit connected to said driving unit for controlling operation of said driving unit;
a light source disposed for generating a standard light having a narrow wavelength bandwidth as a standard wavelength and for directing the standard light through the incident slit;
a sub-wavelength dispersive device disposed for dispersing the standard light and connected to be driven with and fixed on said main wavelength dispersive device; and
a sub-detector having a plurality of detecting elements aligned in a row for detecting diffraction lines of the standard light dispersed from the sub-wavelength dispersive device,
wherein said sub-wavelength dispersive device is constituted by a plane diffraction grating and said main wavelength dispersive device and said sub-wavelength dispersive device are fixed on a driving axis of said driving unit with an angular offset therebetween about the driving axis.

6. A spectrum analysis device comprising:
an incident slit disposed for passing incident light to be spectrally investigated;
a main wavelength dispersive device disposed for dispersing, in a dispersion direction, the incident light which passes through the incident slit;
a main detector disposed for detecting a desired wavelength of the incident light and formed of detecting elements aligned in a row in the dispersion direction for detecting a diffraction line of light dispersed by said wavelength dispersive device;
a driving unit connected for rotating said main wavelength dispersive device in the dispersion direction;
a control unit connected to said driving unit for controlling operation of said driving unit;
a light source for generating a standard light which passes through the incident slit, the standard light having a narrow wavelength bandwidth as a standard wavelength;
a sub-wavelength dispersive device disposed for dispersing the standard light and mounted to be driven with and fixed on, said main wavelength dispersive device; and
a sub-detector having a plurality of detecting elements aligned in a row for detecting standard light diffracted by the sub-wavelength dispersive device,
wherein said sub-wavelength dispersive device is constituted by a plane diffraction grating and said main wavelength dispersive device and said sub-wavelength dispersive device are fixed on a driving axis of said driving unit with an angular offset therebetween about the driving axis.

* * * * *